US012505789B2

(12) United States Patent
Lian et al.

(10) Patent No.: US 12,505,789 B2
(45) Date of Patent: Dec. 23, 2025

(54) DISPLAY DEVICE

(71) Applicant: AUO Corporation, Hsinchu (TW)

(72) Inventors: Shiang-Lin Lian, Hsinchu (TW);
Yueh-Hung Chung, Hsinchu (TW);
Kuo-Wei Ho, Hsinchu (TW)

(73) Assignee: AUO CORPORATION, Hsinchu (TW)

(*) Notice: Subject to any disclaimer, the term of this patent is extended or adjusted under 35 U.S.C. 154(b) by 0 days.

(21) Appl. No.: 18/891,041

(22) Filed: Sep. 20, 2024

(65) Prior Publication Data
US 2025/0104615 A1 Mar. 27, 2025

(30) Foreign Application Priority Data

Sep. 22, 2023 (TW) ................. 112136377

(51) Int. Cl.
G09G 3/32 (2016.01)

(52) U.S. Cl.
CPC ....... *G09G 3/32* (2013.01); *G09G 2300/0426* (2013.01); *G09G 2310/0267* (2013.01)

(58) Field of Classification Search
CPC ... G09G 2300/0426; G09G 2310/0267; G09G 3/20; G09G 3/32; G09G 3/3266; G09G 3/3677
See application file for complete search history.

(56) References Cited

U.S. PATENT DOCUMENTS

| 10,598,963 | B2* | 3/2020 | Kim | G11C 19/28 |
| 10,984,709 | B2* | 4/2021 | Lo | G09G 3/20 |
| 11,127,364 | B2* | 9/2021 | Kim | H10D 86/441 |
| 11,462,174 | B2* | 10/2022 | Lee | G09G 3/3225 |
| 11,688,745 | B2* | 6/2023 | Wang | G02F 1/136286 |
| | | | | 257/72 |
| 11,710,442 | B2* | 7/2023 | Na | G09G 3/3266 |
| | | | | 345/55 |
| 11,721,300 | B2* | 8/2023 | Kwon | G09G 3/3677 |
| | | | | 345/87 |
| 11,730,023 | B2* | 8/2023 | Kim | H10K 50/84 |
| | | | | 257/40 |
| 11,756,465 | B2* | 9/2023 | Kim | G09G 3/3677 |
| | | | | 345/690 |
| 2007/0216634 | A1* | 9/2007 | Kim | G11C 19/28 |
| | | | | 345/100 |
| 2013/0113766 | A1* | 5/2013 | Kim | G09G 3/3674 |
| | | | | 438/34 |

(Continued)

FOREIGN PATENT DOCUMENTS

CN  104078024 A   10/2014
CN  114038439 A * 2/2022

(Continued)

*Primary Examiner* — Kenneth Bukowski
(74) *Attorney, Agent, or Firm* — WPAT, PC

(57) ABSTRACT

A display device includes a substrate, a pixel array and a first scan driver. The pixel array is formed on the substrate. The pixel array includes multiple gate lines and multiple connection lines. The gate lines extend along a first direction. The connection lines extend along a second direction different from the first direction. The first scan driver includes multiple dummy stages and a first stage to a last stage. The dummy stages and the first stage to the last stage of the first scan driver are arranged in sequence along a direction the same as a signal transmission direction on the substrate.

16 Claims, 12 Drawing Sheets

(56) References Cited

U.S. PATENT DOCUMENTS

| | | | |
|---|---|---|---|
| 2014/0043306 A1* | 2/2014 | Min | G09G 3/3677 |
| | | | 345/204 |
| 2015/0379908 A1* | 12/2015 | Kim | G09G 3/006 |
| | | | 345/84 |
| 2016/0162087 A1* | 6/2016 | Lee | G06F 3/047 |
| | | | 345/173 |
| 2016/0225304 A1* | 8/2016 | Kim | G09G 3/3666 |
| 2017/0046999 A1* | 2/2017 | Kim | G09G 3/2092 |
| 2018/0018920 A1* | 1/2018 | Kim | G11C 19/28 |
| 2018/0075810 A1 | 3/2018 | Kim | |
| 2020/0082763 A1 | 3/2020 | Kim | |
| 2021/0125565 A1 | 4/2021 | Kim | |
| 2021/0256913 A1* | 8/2021 | Hao | G09G 3/3266 |
| 2021/0335271 A1* | 10/2021 | Bae | G11C 19/287 |
| 2022/0302175 A1* | 9/2022 | Shin | H10D 86/60 |
| 2023/0113452 A1* | 4/2023 | Kim | G09G 3/3266 |
| | | | 345/691 |

FOREIGN PATENT DOCUMENTS

| | | | |
|---|---|---|---|
| CN | 115775501 A * | 3/2023 | |
| TW | 201816475 A | 5/2018 | |
| TW | 202040227 A | 11/2020 | |
| TW | 202109482 A | 3/2021 | |
| TW | 202407666 A | 2/2024 | |

* cited by examiner

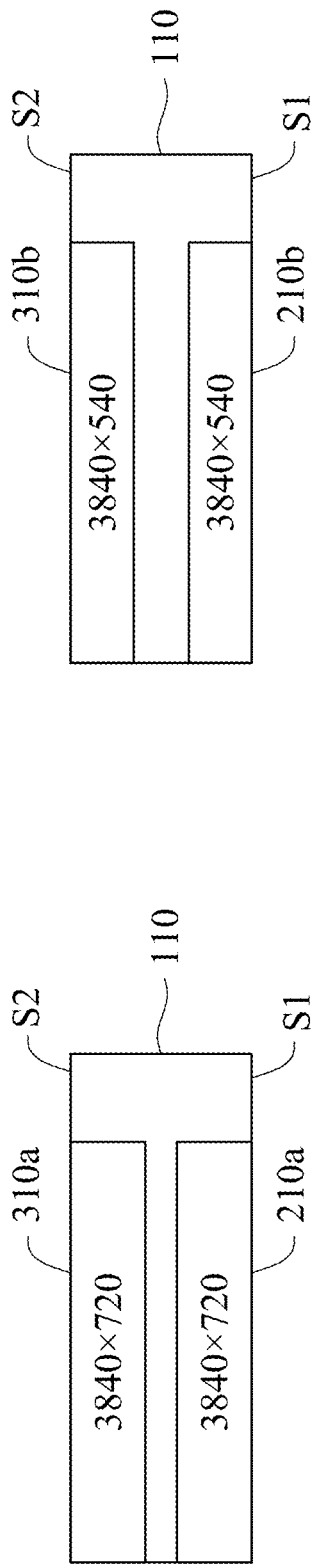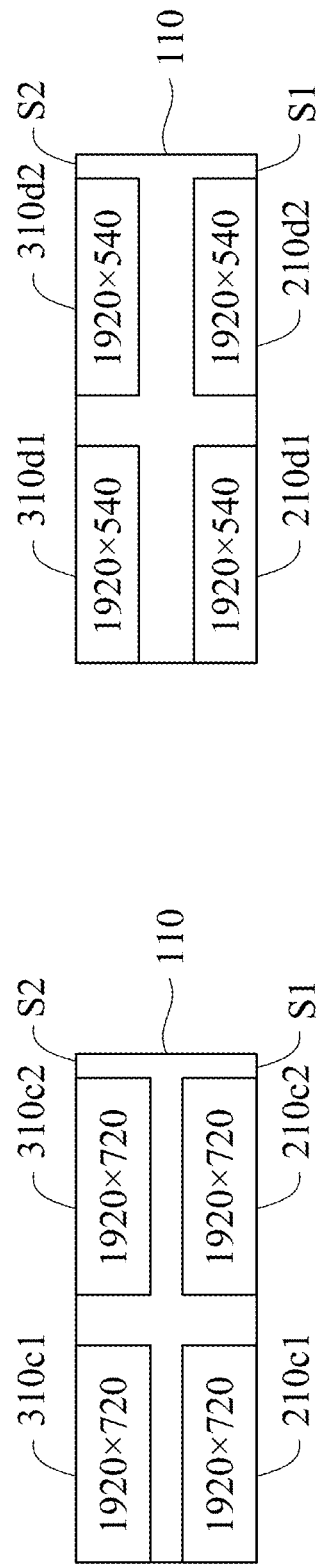

DISPLAY DEVICE

CROSS-REFERENCE TO RELATED APPLICATION

This application claims priority to Taiwan Application Serial Number 112136377, filed Sep. 22, 2023, which is herein incorporated by reference in its entirety.

BACKGROUND

Field of Invention

The present disclosure relates to a display device, particularly to a display device comprising a substrate suitable for cutting in various proportions.

Description of Related Art

Presently, the application of display panels is quite extensive. There is an increased demand for the resolution of display panels and the narrowness of the bezel. However, traditionally designed gate drivers on the left and right edge areas of the substrate cannot support arbitrary cutting requirements. Therefore, how to provide a display device to solve the above problems is an important issue in this field.

SUMMARY

The disclosure provides a display device. The display device includes a substrate, a pixel array, and a first scan driver. The pixel array is formed on the substrate. The pixel array includes a plurality of gate lines and a plurality of connection lines. These gate lines extend in a first direction. These connection lines extend in a second direction different from the first direction. The first scan driver includes a plurality of dummy stages and a first stage to a last stage. These dummy stages and the first stage to the last stage of the first scan driver are arranged in sequence along a direction the same direction as the first signal transmission direction on the substrate.

The disclosure provides a display device. The display device includes a substrate, a pixel array and a first scan driver. The pixel array formed on the substrate, and the pixel array includes a plurality of gate lines and a plurality of connection lines. The gate lines extend along a first direction. The connection lines extend along a second direction different from the first direction. The first scan driver formed on the substrate includes a first stage to a last stage and a plurality of dummy stages. The first stage to the last stage of the first scan driver are respectively connected through the connection lines to the gate lines. The dummy stages of the first scan driver are closer to the first stage of the first scan driver than the last stage of the first scan driver.

The disclosure provides a display device. The display device includes a substrate, a pixel array, a first scan driver and a second scan driver. The pixel array formed on the substrate includes a plurality of gate lines extending along a first direction, a plurality of connection lines extending along a second direction different from the first direction and a plurality of dummy connection lines extending along the second direction different from the first direction. The first scan driver formed on a first edge area of the substrate includes a first stage to a last stage and a plurality of dummy stages. The first stage to the last stage of the first scan driver are respectively connected through the connection lines to the gate lines. The second scan driver formed on a second edge area of the substrate includes a first stage to a last stage and a plurality of dummy stages. The first stage to the last stage of the second scan driver are respectively connected through the connection lines to the gate lines. The dummy connection lines respectively connect the dummy stages of the first scan driver to the dummy stages of the second scan driver.

The disclosure provides a display device. The display device includes a substrate, a pixel array, a first scan driver, and a second scan driver. The pixel array is formed on the substrate. The pixel array includes a plurality of gate lines and a plurality of connection lines. These gate lines extend in a first direction. These connection lines extend in a second direction different from the first direction. The first scan driver, formed on the substrate, includes a first stage to a last stage and a plurality of dummy stages, wherein the first stage to the last stage of the first scan driver are respectively connected through the connection lines to the gate lines, wherein these dummy stages and the first stage to the last stage are arranged in sequence along a direction the same as the first signal transmission direction on the substrate. The second scan driver is formed on the substrate. The second stage includes a first stage to a last stage and a plurality of dummy stages, wherein the first stage to the last stage and these dummy stages of the second scan driver are arranged in sequence along a direction the same as the second signal transmission direction on the substrate, and wherein the second signal transmission direction is opposite to the first signal transmission direction.

In summary, the substrate of the disclosed display device can comply with the cutting requirements of various sizes and has the effect of a narrow bezel, thereby reducing manufacturing costs and improving product adaptability.

BRIEF DESCRIPTION OF THE DRAWINGS

The present disclosure can be more fully understood by reading the following detailed description of the embodiment, with reference made to the accompanying drawings as follows.

FIGS. 3 to 10 are schematic diagrams of substrates cut at different scales according to some embodiments of the present disclosure.

DETAILED DESCRIPTION

Figure 1:
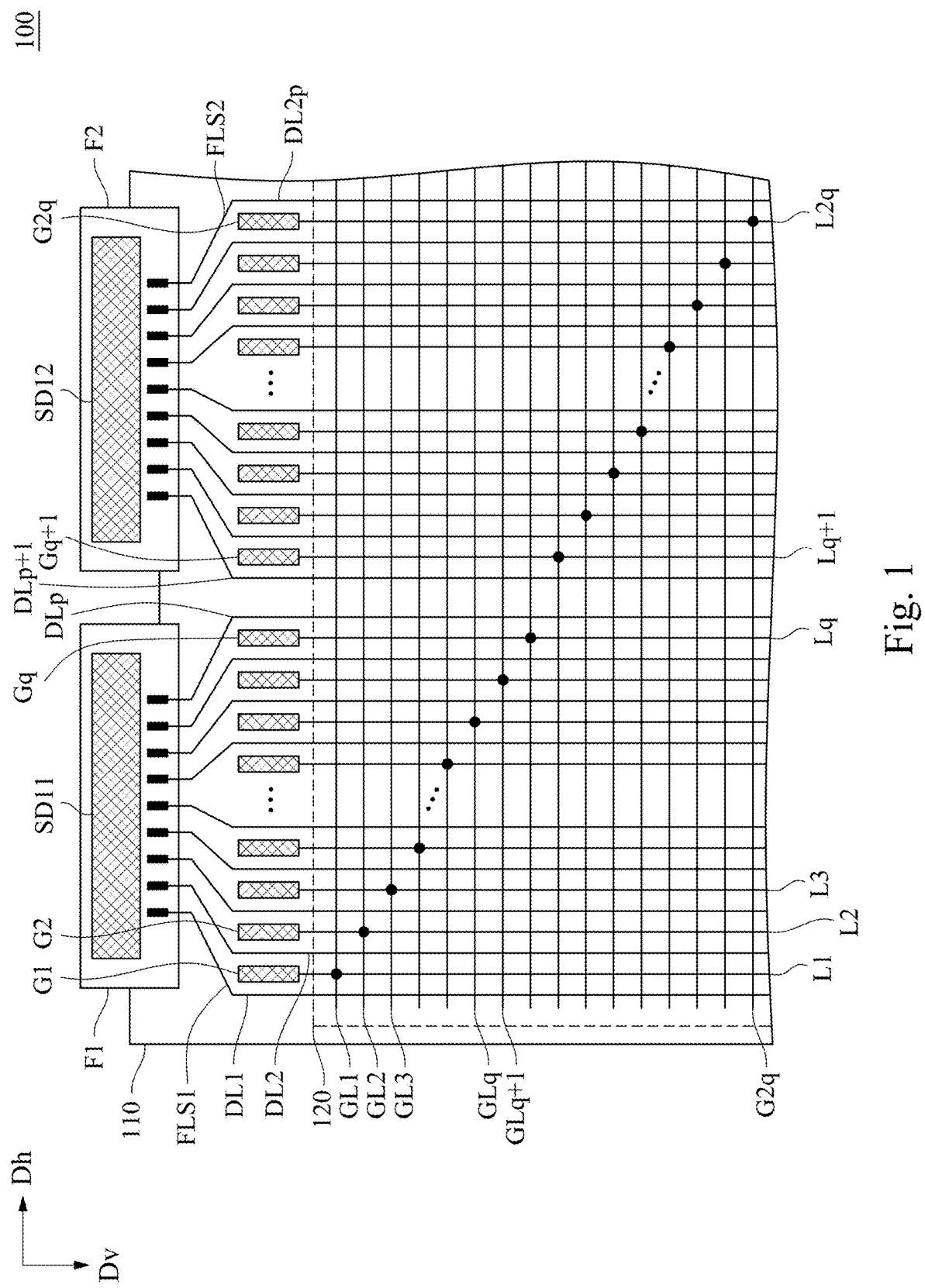
FIG. 1 is a schematic diagram of a display device according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms "comprise" or "comprising," "include" or "including," "have" or "having," "contain" or "containing" and the like used herein are to be understood to be open-ended, i.e., to mean including but not limited to.

Please refer to FIG. 1. FIG. 1 is a schematic diagram of a display device 100 according to some embodiments of the present disclosure. As shown in FIG. 1, the display device 100 includes a substrate 110, stages G1-G2q, a pixel array 120, and source drivers SD11 and SD12. In some embodiments, the stages G1-G2q are implemented by using gate driver on array (GOA) technology, forming a device layout region on the substrate 110. In some embodiments, the stages G1-G2q and the source drivers SD11 and SD12 are disposed in the same edge area of the substrate 110, in order to achieve a narrow bezel effect.

In some embodiments, the source drivers SD11 and SD12 can be packaged on flexible printed circuit boards F1 and F2 using chip on film (COF) technology. In some embodiments, the source drivers SD11 and SD12 are fan-out connected to multiple fan-out traces FLS1 and FLS2 in component layout regions where the stages G1-Gq and Gq+1-G2q disposed therein.

In some embodiments, since patterns of the transmission lines (e.g., data lines DL1-DL2p and connection lines L1-L2q), pixels included in the pixel array 120 and the stages G1-G2q are repetitive, different exposed regions have the same pattern by using an appropriate mask, as such the manufacturing costs can be reduced. In some embodiments, in order to ensure that the wiring in each exposed region can be fan-out connected to the source drivers (e.g., source driver SD11, SD22), the numbers of stages interleaved among the data lines connected through the fan-out traces to each of the source drivers are the same to each other.

For example, the source driver SD11 is electrically connected through multiple fan-out traces FLS1 to the data lines DL1-DLp in a component layout region where the stages G1-Gq disposed therein. Another example is that the source driver SD12 is electrically connected through multiple fan-out traces FLS2 to the data lines DLp+1-DL2p in a component layout region where the stages Gq+1-G2q disposed therein.

In some embodiments, the gate lines GL1-GL2q extend along a first direction (e.g., horizontal direction Dh), and the data lines DL1-DL2p extend along a second direction (e.g., vertical direction Dv). In some embodiments, the stages G1-G2q are arranged along the horizontal direction Dh. In some embodiments, the connection lines L1-Lq extend along the vertical direction Dv, and the connection lines L1-Lq are configured to connect the gate lines GL1-GLq to the stages G1-Gq, respectively. Similarly, the connection lines Lq+1-L2q are configured to connect the gate lines GLq+1-GL2q to the stages Gq+1-G2q, respectively.

Figure 2:
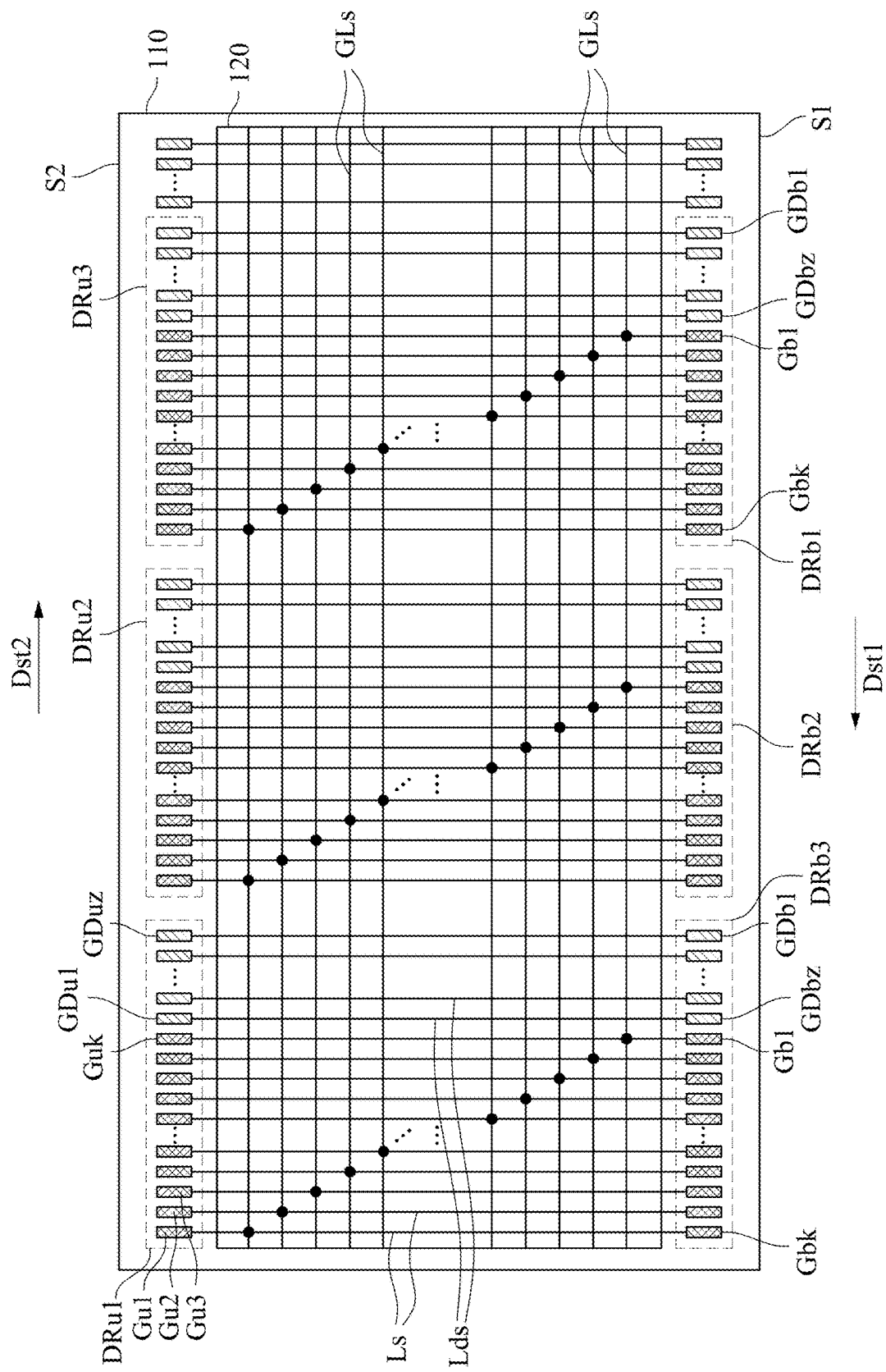
FIG. 2 is a schematic diagram of a substrate of a display device according to some embodiments of the present disclosure.

Please refer to FIG. 2. FIG. 2 is a schematic diagram of the substrate 110 of the display device 100 according to some embodiments of the present disclosure. As shown in FIG. 2, three scan drivers GDb1-GDb3 are disposed in the first edge area of the substrate 110. In some embodiments, the first edge area is adjacent to an edge S1 of the substrate 110. In some embodiments, more or fewer scan drivers can be set depending on the horizontal resolution of the substrate 110, in order to improve IR drop when gate lines are relatively long.

In some embodiments, the component layout region where one scan driver (e.g., scan driver DRb1) disposed therein are fan-out connected to multiple source drivers (e.g., m source drivers). To comply with aforementioned exposure and correspondingly connection requirements, the total number of stages (e.g., stages Gb1-Gbk and GDb1-GDbz) included in one scan driver (e.g., scan driver DRb1) is a multiple of the number of the m source drivers. In other words, the number of the multiple source drivers is a factor of the total number of stages (e.g., stages Gb1-Gbk and GDb1-GDbz) included in one scan driver (e.g., scan driver DRb1).

In some embodiments, it is assumed that the total number of gate lines GLs on the substrate 110 is "k". To drive k gate lines GLs, the scan driver DRb1 includes at least k stages Gb1-Gbk. In some cases, the number "k" usually cannot be evenly divided by the number of the m source drivers, causing the k stages to be unevenly interleaved among the data lines connected through the fan-out traces to the m source drivers. Therefore, additional stages GDb1-GDbz are added into the scan driver DRb1, as such the total number of stages (e.g., stages Gb1-Gbk and GDb1-GDbz) included in one scan driver (e.g., scan driver DRb1) is a multiple of the number of the m source drivers.

For example, if m (e.g., 5) source drivers are correspondingly connected to the wiring in the component layout region where the scan driver DRb1 disposed therein, there are k (e.g., 1456) gate lines GLs on the substrate 110. In some embodiments, the substrate 110 can be cut into various sizes to obtain a substrate of the desired size. In some embodiments, in order to comply with the requirements of various sizes of panel, a cutting space needs to be reserved, and the total number of gate lines GLs on the substrate 110 needs to be more than the maximum number of gate lines actually scanned. For example, if a substrate with a vertical resolution of 1440 pixels (or two substrates with a vertical resolution of 720 pixels) is to be cut, a cutting space of 16 pixels needs to be reserved in the vertical direction, so the substrate 110 contains 1456 gate lines GLs, where 16 of the 1456 gate lines GLs can be considered as dummy gate lines. In some embodiments, the scan driver DRb1 may be configured with at least 1456 stages to drive 1456 gate lines GLs. In some embodiments, since 1456 cannot be evenly interleaved among the data lines connected through the fan-out traces to 5 source drivers, the total number of stages Gb1-Gbk and GDb1-GDbz included in the scan driver DRb1 are set to be greater than the number of gate lines GLs on the substrate 110 (e.g., 1456), and the said total number can divisible by the number of source drivers (e.g., 5). In some embodiments, the number of stages included in the scan driver DRb1 is 1520, and the 1520 stages are evenly interleaved among the lines (e.g., data lines) correspondingly connected through the fan-out traces to the 5 source drivers. In this case, 304 drivers are interleaved among the data lines connected through the fan-out traces to one source driver.

In some embodiments, one source driver drives 320 pixel channels (960 sub-pixel channels). In some embodiments, 5 source drivers drive 1600 pixel channels, and the 5 source drivers are connected to the component layout region where one scan driver DRb1 including a total of 1520 stages Gb1-Gbk and GDb1-GDbz disposed therein.

In some embodiments, the connection lines Ls electrically connect the stages Gb1-Gbk to the corresponding gate lines GLs, respectively. In some embodiments, the stages GDb1-GDbz correspond to the corresponding connection lines Lds. In some embodiments, the connection lines Lds are electrically isolated from the pixel array 120, i.e., the connection lines Lds do not electrically connect the stages GDb1-GDbz to the pixel array 120. In some embodiments, the connection lines Lds can be considered as dummy connection lines.

In some embodiments, the stages GDb1-GDbz can be considered as dummy stages, and the stages Gb1-Gbk can be considered as first stage to last stage. In some embodiments, the stage Gb1 is the first stage, and the stage Gbk is the last stage. In some embodiments, the stage Gb1 (first stage) of the scan driver DRb1 are closer to the stages GDb1-GDbz (dummy stages) than the stage Gbk (last stage) of the scan driver DRb1. In some embodiments, the stages GDb1-GDbz and the stages Gb1-Gbk are arranged in sequence along a direction the same as the signal transmission direction Dst1 on the first edge area of the substrate 110. In some embodiments, the first signal transmission direction Dst1 is a direction that a start pulse provided as a shift data being transmitted from the first stage (such as, the stage Gb1) to last stage (such as, the stage Gbk) of a scan driver (such as, the stage DRb1).

In some embodiments, the configuration of the scan drivers DRb2 and DRb3 is similar to that of the scan driver DRb1, and the connection relationship between the scan drivers DRb2 and DRb3, the gate lines GLs and the corresponding connection lines is similar to the connection relationship between the scan driver DRb1, the gate lines GLs and the connection lines Ls, thus the description is omitted here.

In some embodiments, the scan drivers DRb1-DRb3 and the scan drivers DRu1-DRu3 are disposed in opposite edge areas of the substrate 110 (e.g., the first edge area and the second edge area of the substrate 110). In some embodiments, the second edge area is adjacent to an edge S2 of the substrate 110. In some embodiments, the edge S1 and the edge S2 are opposite edges of the substrate 110. In some embodiments, since the scan drivers DRb1-DRb3 and DRu1-DRu3 are respectively disposed in opposite edge areas of the substrate 110, a substrate cut from either upper or lower edge area (first edge area or second edge area) of the substrate 110 is able to be driven.

In some embodiments, the scan driver DRu1 will have at least k stages Gu1-Guk to drive k gate lines GLs. In some embodiments, wiring in the component layout region where the scan driver DRu1 disposed therein is configured to correspondingly connect to m source drivers. In some cases, the number "k" usually cannot be evenly divided by the number of the m source drivers, causing the k stages to be unevenly interleaved among the data lines connected to the fan-out traces of the m source drivers. Therefore, additional stages GDu1-GDuz are added into the scan driver DRu1, as such the total number of stages (e.g., stages Gu1-Guk and GDu1-GDuz) included in one scan driver (e.g., scan driver DRu1) is a multiple of the number of the m source drivers. In some embodiments, a total number of the GDb1-GDbz stages (dummy stages) and the stage Gb1 (first stage) to stage Gbk (last stage) of the scan driver DRb1 is the same as a total number of the GDu1-GDuz (dummy stages) and the stage Gu1 (first stage) to the stage Guk (last stage) of scan driver DRu1.

In some embodiments, the connection lines Ls electrically connect the stages Gu1-Guk to the corresponding gate lines GLs. In some embodiments, the stages GDu1-GDuz correspond to the corresponding connection lines Lds. In some embodiments, the connection lines Lds are electrically isolated from the pixel array 120, i.e., the connection lines Lds do not electrically connect the stages GDb1-GDbz to the pixel array 120. In some embodiments, the connection lines Lds can be considered as dummy connection lines.

In some embodiments, the stages GDu1-GDuz can be considered as dummy stages, and the stages Gu1-Guk can be considered as first stage to last stage. In some embodiments, the stage Gu1 is the first stage, and the stage Guk is the last stage. In some embodiments, the stage Guk (last stage) of the scan driver DRu1 are closer to the stages GDu1-GDuz (dummy stages) than the stage Gu1 (first stage) of the scan driver DRu1. In some embodiments, the stages Gu1-Guk and the stages GDu1-GDuz are arranged in sequence along a direction the same as the signal transmission direction Dst2 on the second edge area of the substrate 110. In some embodiments, the signal transmission direction Dst1 is opposite to the signal transmission direction Dst2. In some embodiments, the first signal transmission direction Dst2 is a direction that a start pulse provided as a shift data being transmitted from the first stage (such as, the stage Gu1) to last stage (such as, the stage Guk) of a scan driver (such as, the stage DRu1).

In some embodiments, the configuration of the scan drivers DRu2 and DRu3 is similar to that of the scan driver DRu1, and the connection relationship between the scan drivers DRu2 and DRu3, the gate lines GLs and the corresponding connection lines is similar to the connection relationship between the scan driver DRu1, the gate lines GLs and the connection lines Ls, thus the description is omitted here.

It is worth noting that, in each of the scan drivers DRb1-DRb3 disposed in the first edge area of the substrate 110, the dummy stages (stages GDb1-GDbz) and the first stage to last stage (stages Gb1-Gbk) are arranged along the signal transmission direction Dst1, and the dummy stages (stages GDb1-GDbz) are arranged in front of the first stage to last stage (stages Gb1-Gbk). In each of the scan drivers DRu1-DRu3 disposed in the second edge area of the substrate, the first stage to last stage (stages Gu1-Guk) and the dummy stages (stages GDu1-GDuz) are arranged along the signal transmission direction Dst2, and the dummy stages (stages GDu1-GDuz) are arranged in back of the first stage to last stage (stages Gu1-Guk). Thus, the connection lines Ls can fully connect the initial to last stages (stages Gb1-Gbk and Gu1-Guk) included in the scan drivers DRb1 and DRu3 disposed in both edge areas (first edge area and second edge area) to the gate lines GLs.

Please refer to FIG. 3. FIG. 3 to FIG. 10 are schematic diagrams of the substrate 110 cut into different sizes according to some embodiments of the present disclosure. In some embodiments, the size of the substrate 110 is taken as 5120*1456 pixels as an example. In other embodiments, the substrate 110 can be implemented in other suitable sizes, which is not intended to limit the present disclosure.

As shown in FIG. 3 and FIG. 4, two substrates respectively include the upper and lower edge areas of the substrate 110 can be cut from the substrate 110 (e.g., substrates 210a and 310a in FIG. 3 can be cut from the substrate 110; or substrates 210b and 310b in FIG. 4 can be cut from the substrate 110). In some embodiments, the size of each of the substrates 210a and 310a is 3840 pixels*720 pixels. In some embodiments, the size of each of the substrates 210b and 310b is 3840 pixels*540 pixels. In the other embodiments, the cut substrates can be implemented in other suitable sizes. The sizes of substrates 210a~210b and 310a~310b are merely examples, and not intended to limit the present disclosure.

As shown in FIG. 5 and FIG. 6, four substrates respectively include the upper and lower edge areas of the substrate 110 can be cut from the substrate 110 (e.g., substrates 210c1~210c2 and 310c1~310c2 in FIG. 5 can be cut from the substrate 110; or substrates 210d1~210d2 and 310d1~310d2 in FIG. 6 can be cut from the substrate 110). In some embodiments, the size of the substrates 210c1-210c2 and 310c1-310c2 is 1920 pixels*720 pixels. In some embodiments, the size of each of the substrates 210d1-210d2 and 310d1-310d2 is 1920 pixels*540 pixels. In the other embodiments, the cut substrates can be implemented in other suitable sizes. The sizes of substrates 210c1~210c2, 210d1~210d2, 310c1~310c2 and 310a~310b are merely examples, and not intended to limit the present disclosure.

Figure 7:
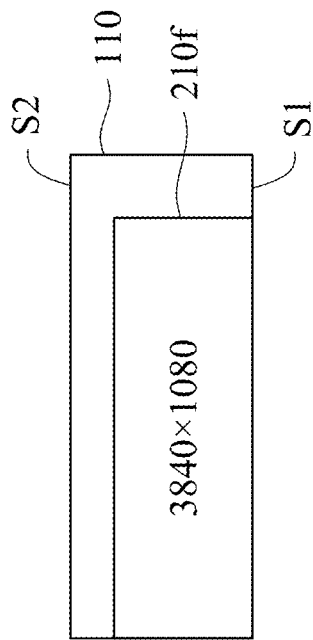
Figure 8:
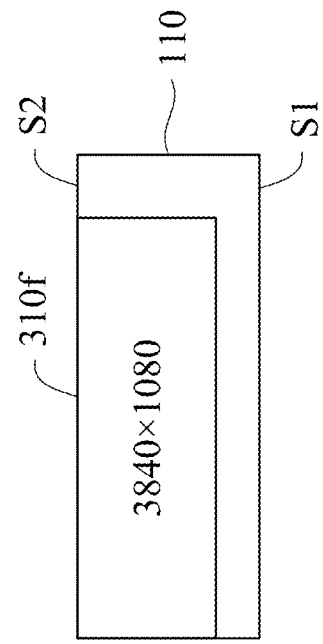

As shown in FIG. 7 and FIG. 8, one substrate can be cut from one edge area of the substrate 110 (e.g., a substrate 210e or 210f is cut from the first edge area of the substrate 110). In some embodiments, the size of the substrate 210e is 5140 pixels*1440 pixels. In some embodiments, the size of the substrate 210f is 3840 pixels*1080 pixels. In other embodiments, the cut substrates can be implemented in other suitable sizes. The sizes of substrates 210e and 210f are merely examples, and not intended to limit the present disclosure.

Figure 9:
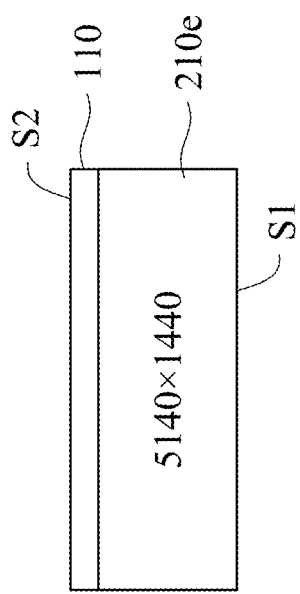
Figure 10:
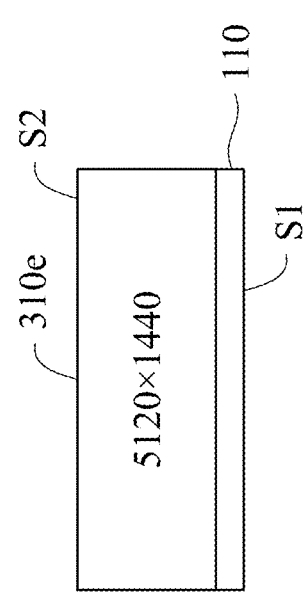

As shown in FIG. 9 and FIG. 10, one substrate can be cut from one edge area of the substrate 110 (e.g., a substrate 310e or 310f is cut from the second edge area of the substrate 110). In some embodiments, the size of the substrate 310e is 5140 pixels*1440 pixels. In some embodiments, the size of the substrate 310f is 3840 pixels*1080 pixels. In other embodiments, the cut substrates can be implemented in other suitable sizes. The sizes of substrates 310e and 310f are merely examples, and not intended to limit the present disclosure.

Figure 11:
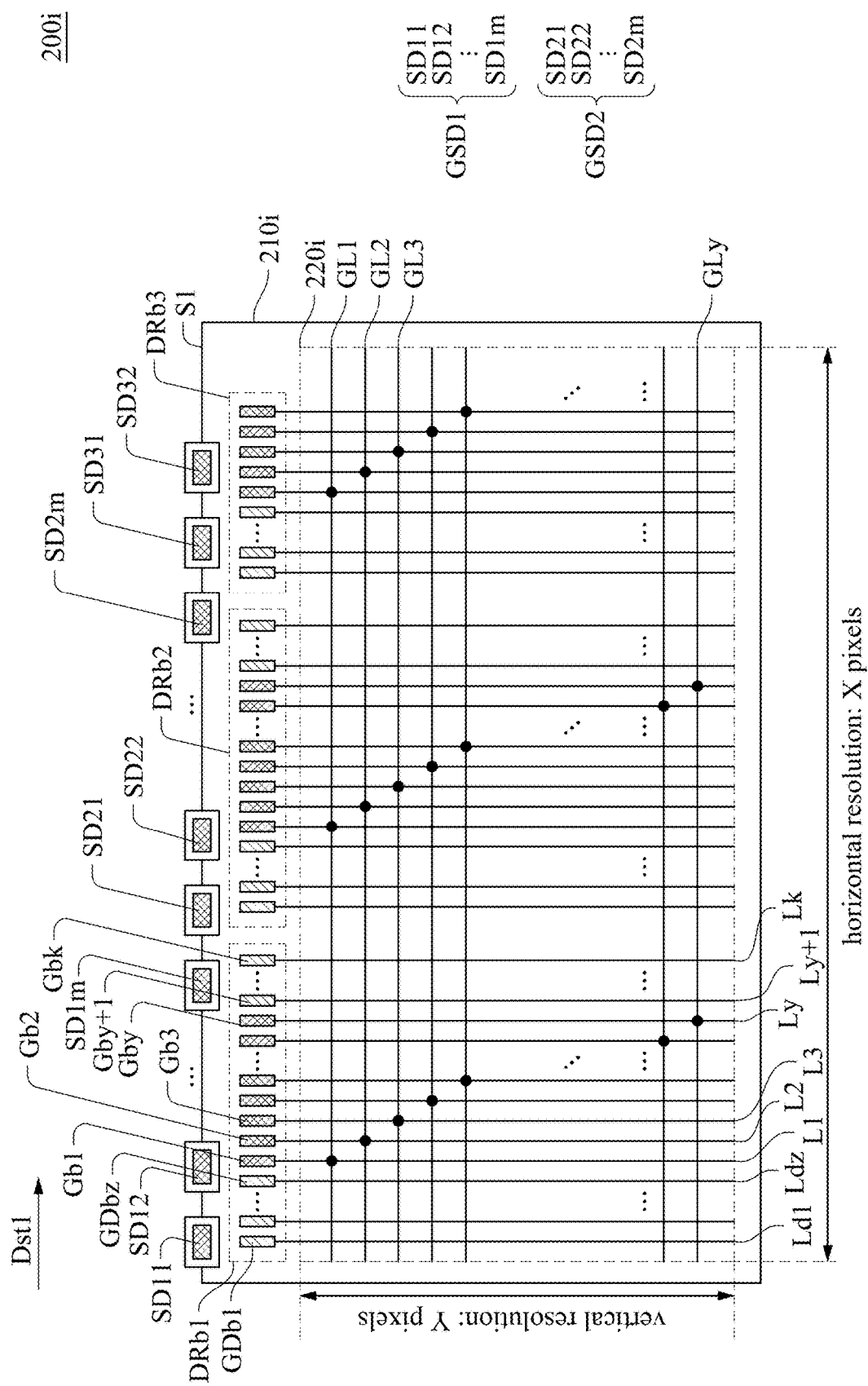
FIG. 11 is a schematic diagram of a display device according to some embodiments of the present disclosure.

Please refer to FIG. 11, which is a schematic diagram of a display device 200i according to some embodiments of the present disclosure. In some embodiments, the substrate 210i of the display device 200i is cut from the first edge area of the substrate 110 in FIG. 2, as such the arrangement of the stages of each of the substrates 210a-210f in the embodiments of FIG. 3 to FIG. 8 is similar to the arrangement of the stages in the scan driver on the substrate 210i in in the embodiment of FIG. 11.

As shown in FIG. 11, the display device 200a includes a substrate 210i, scan drivers DRb1-DRb3, a pixel array 220i, source driver groups GSD1-GSD2, and source drivers SD31-SD32. In some embodiments, the scan driver DRb1 includes stages GDb1-GDbz, Gb1-Gby, and Gby+1-Gbk. In some embodiments, the stages GDb1-GDbz are dummy stages, and the stages Gb1-Gby are first stage to last stage, where the stage Gb1 is the first stage, and the stage Gby is the last stage. In some embodiments, the stages GDb1-GDbz (dummy stages) and stages Gb1-Gby (first stage to last stage) are arranged in sequence along the signal transmission direction Dst1 on the first edge area of the substrate 210i.

In some embodiments, the pixel array 220i includes gate lines GL1-GLy and connection lines Ld1-Ldz, L1-Ly, and Ly+1-Lk. In some embodiments, the vertical resolution of the pixel array 220i depends on the number of gate lines GL1-GLy. In some embodiments, the connection lines Ld1-Ldz are dummy connection lines, and the connection lines L1-Ly connect the stages Gb1-Gby to the corresponding gate lines GL1-GLy. In some embodiments, the gate lines GL1-GLy are arranged along the vertical direction on the substrate 210i, and the gate lines GL1-GLy are arranged in sequence based on distances from near to far from the scan driver DRb1, and the connection lines L1-Ly connect the gate lines GL1-GLy to the stages Gb1-Gby in sequence according to the distance from near to far relative to the scan driver DRb1. For example, the connection line L1 connects the gate line GL1, which is closest to the scan driver DRb1, to the stage Gb1, the connection line L2 connects the gate line GL2, which is the second closest to the scan driver DRb1, to the stage Gb2, and the connection line L3 connects the gate line GL3, which is the third closest to the scan driver DRb1, to the stage Gb3, as shown in FIG. 11. In other embodiments, the connection lines L1-Ly connect the gate lines GL1-GLy to the stages Gb1-Gby in a partially interleaved manner according to the distance from near to far relative to the scan driver DRb1, but this is not limited to this case. For example, it is assumed that every three gate lines are connected to the scan driver in a interleaved order, the gate line closest to the scan driver is connected through a connection line to the first stage, the third closest gate line is connected through another connection line to the second stage, and the second closest gate line is connected through another connection line to the third stage. Similarly, the fourth closest gate line is connected through another connection line to the fourth stage, the sixth closest gate line is connected through another connection line to the fifth stage, and the fifth closest gate line is connected through another connection line to the sixth stage, and so on.

In some embodiments, the configuration of the scan driver DRb2 is similar to that of the scan driver DRb1, and the connection relationship of the scan driver DRb2, the gate lines GL1-GLy and the corresponding connection lines is similar to the connection relationship of the scan driver DRb1, the gate lines GL1-GLy and the connection lines L1-Ly, thus the description is omitted here.

In some embodiments, the source driver group GSD1 is configured to correspondingly connect to the wiring in the component layout region wherein the scan driver DRb1 disposed therein. In some embodiments, the source driver group GSD1 includes m source drivers SD11-SD1m. In some embodiments, in order to ensure that the fan-out routing of the m source drivers SD11-SD1m can correspondingly connect to the wiring in the component layout region where the scan driver DRb1 disposed therein, the total number of all stages GDb1-GDbz and Gb1-Gbk included in the scan driver DRb1 is a multiple of the said "m". In other words, the said "m" is a factor of the total number of all stages GDb1-GDbz and Gb1-Gbk in the scan driver DRb1.

In some embodiments, there are q stages (e.g., 304 stages) interleaved among traces connected to each of the source drivers SD11-SD1m, and each of the source drivers SD11-SD1m is configured to drive p pixel channels (e.g., 320 pixel channels or 960 sub-pixel channels).

In some embodiments, the display device 200i includes source driver groups GSD1-GSD2 and source drivers SD31-SD32. The source driver group GSD1 includes 5 source drivers SD11-SD1m, and the source driver group GSD2 includes 5 source drivers SD21-SD2m. In some embodiments, each of the aforementioned source drivers is configured to drive 320 pixel channels. In other words, the horizontal resolution of the display device 200i is 3840 pixels. In other embodiments, the horizontal resolution of the display device 200i depends on the size of the substrate 210i and the configuration of the number of source drivers, which is not intended to limit the present disclosure.

Figure 12:
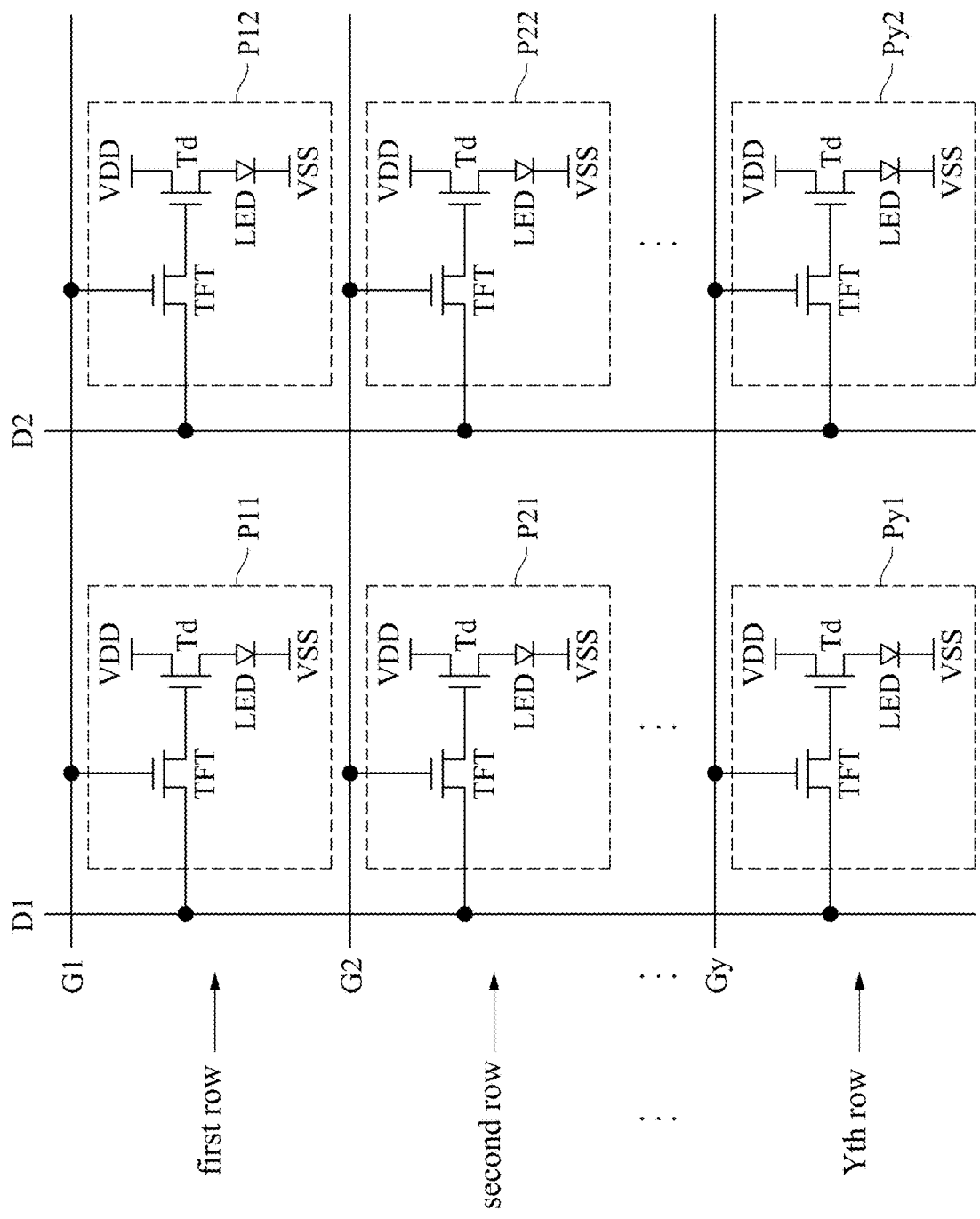
FIG. 12 is a schematic diagram of a pixel circuit in a pixel array on a substrate according to some embodiments of the present disclosure.

Please refer to FIG. 12. FIG. 12 is a schematic diagram of the pixel circuits P11-Py2 included in the pixel array 220i on the substrate 210i according to some embodiments of the present disclosure. As shown in FIG. 12, the pixel array 220i includes pixel circuits P11-Py1 and P12-Py2.

In some embodiments, which row and column where a pixel circuit disposed in depends on the gate line (such as, the gate lines G1-G3) and the data line (such as, the data lines D1-D2). For example, the data line D1 connects the pixel circuits P11-Py1 included in the first column to the source driver SD1, and the data line D2 connects the pixel circuits P12-Py2 included in the second column to the source driver SD1. The gate line G1 connects the pixel circuits P11-P12 included in the first row through the connection line L1 to the stage GOA1, and the gate line G2 connects the pixel circuits P21-P22 included in the second row through the connection line L2 to the stage GOA2. The gate line Gy connects the pixel circuits Py1-Py2 included in the Yth row through the connection line Ly to a corresponding stage.

In some embodiments, each of the pixel circuits P11-Py1 and P12-Py2 includes a transistor TFT, a driving transistor Td, and a light-emitting element LED. The transistor TFT is configured to transmit the data voltage to the gate terminal of the driving transistor Td. In some embodiments, the driving transistor Td and the light-emitting element LED are electrically coupled between the system high voltage terminal VDD and the system low voltage terminal VSS. In some embodiments, the conduction level of the driving transistor Td depends on the potential of the gate terminal of the driving transistor Td, so as to control the driving current flowing from the system high voltage terminal VDD through the driving transistor Td and the light-emitting element LED to the system low voltage terminal VSS, thereby controlling the brightness of the light-emitting element LED.

Figure 13:
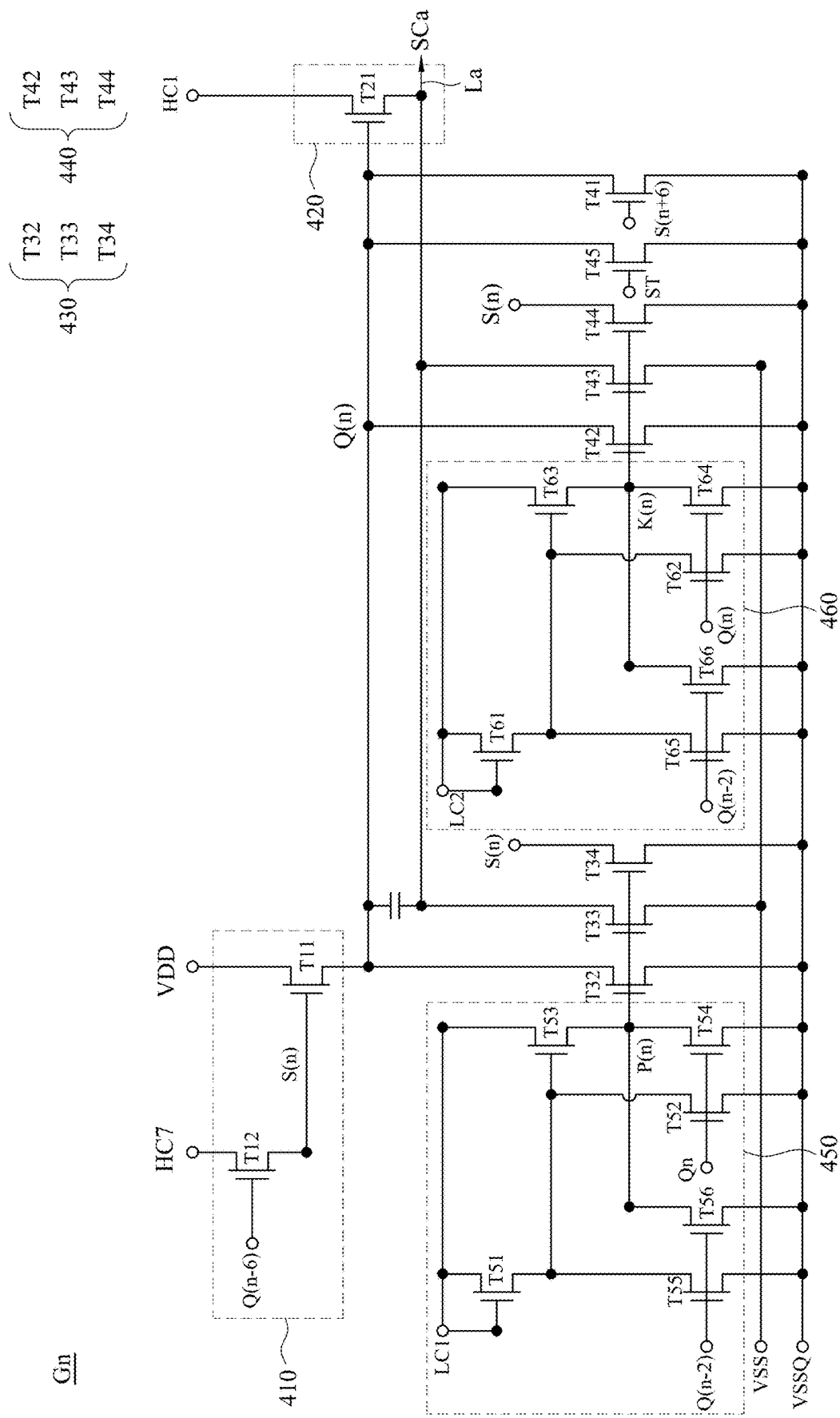
FIGS. 13 and 14 are schematic diagrams of a stage according to some embodiments of the present disclosure.
Figure 14:
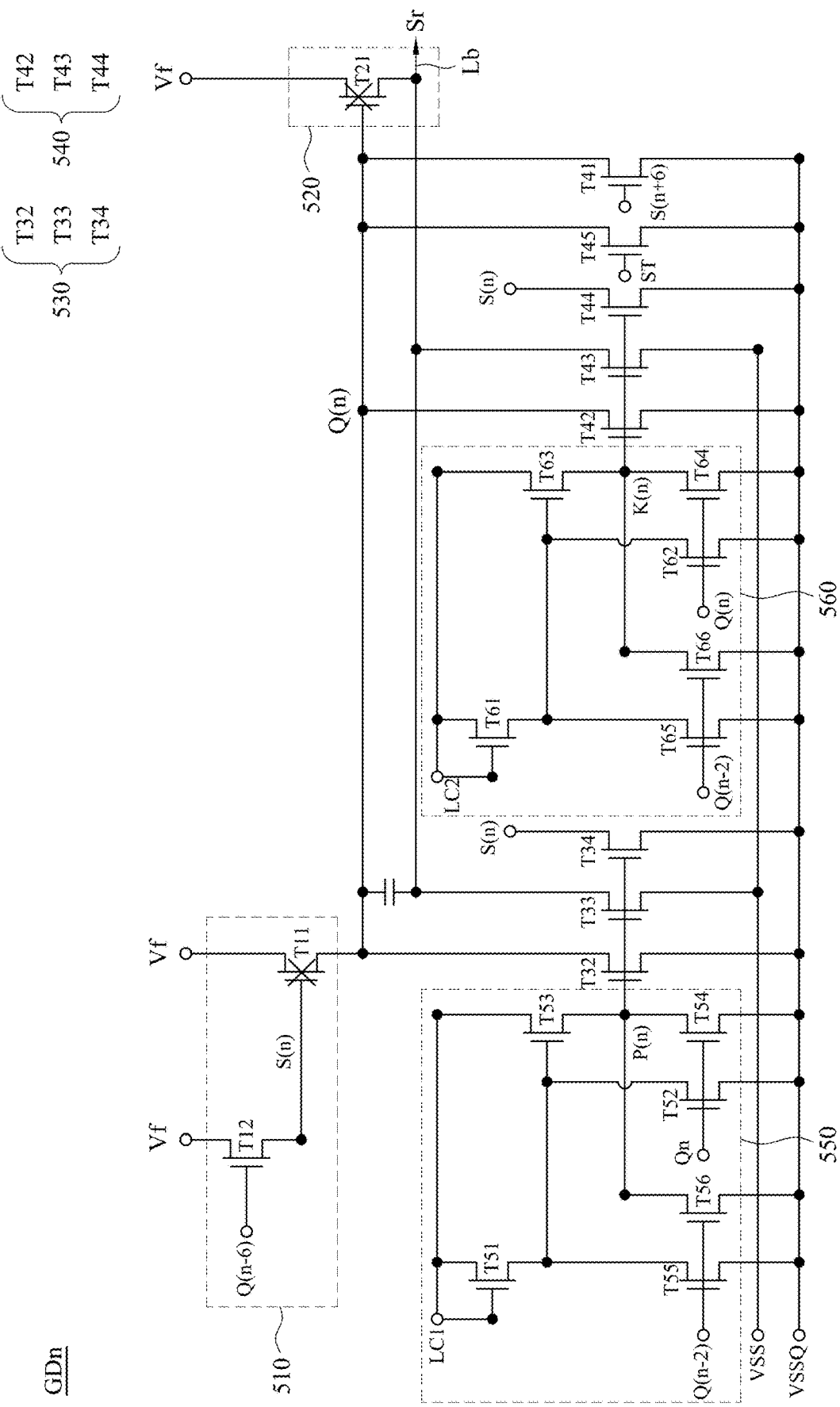

Please refer to FIG. 11, FIG. 13, and FIG. 14. FIG. 13 and FIG. 14 are schematic diagrams of the stages Gn and GDn according to some embodiments of the present disclosure. In some embodiments, the stage Gn outputs a scan signal SCa to the corresponding connection line La. In some embodiments, the stage GDn is inactive.

In some embodiments, each of the stages Gb1-Gby (first stage to last stage) of the display device 200i can be implemented by the stage Gn of FIG. 13, and each of the stages GDb1-GDbz and Gby+1-Gbk (dummy stages) can be implemented by the stage Gn of FIG. 14.

As shown in FIG. 13, the stage Dn includes a pull-up control circuit 410, a pull-up circuit 420, pull-down control circuits 450 and 460, a pull-down circuit 430, and a pull-down circuit 440.

In some embodiments, by applying the voltage of node Q(n−6) to the gate terminal of the transistor T12 in the pull-up control circuit 410, the transistor T12 is turned on, and the clock signal HC7 is transmitted to the gate terminal of the transistor T11 to turn on the transistor T11, thereby transmitting the voltage of the system high voltage terminal VDD to the operation node Q(n) through the transistor T11. In some embodiments, the node S(n) is located at the connection point between the gate terminal of the transistor T11 and one end of the transistor T12.

In some embodiments, when the transistor T21 in the pull-up circuit 420 is turned on according to the potential of the operation node Q(n), the clock signal HC1 is transmitted to the connection line La through the transistor T21, as such the stage Gn outputs the clock signal HC1 as the scan signal SCa.

In some embodiments, the scan signal SCa is transmitted to the connected gate line (e.g., gate line GL1) through the connection line (e.g., connection line L1), thereby turning on the transistors TFT of the pixel circuits P11 and P22 in the same row of the pixel array 220i, and then transmitting the corresponding data voltage to the gate terminals of the driving transistors Td in the pixel circuits P11 and P22 through the data lines D1 and D2, as shown in FIG. 11 and FIG. 12.

In some embodiments, by applying the potential of the operation node Q(n) to the gate terminal of the transistor T52 in the pull-down control circuit 450, the transistor T52 is turned on, and the potential of the system low voltage terminal VSSQ is transmitted to the gate terminal of the transistor T53 through the transistor T52 to turn off the transistor T53. In some embodiments, by applying the clock signal LC1 to the gate terminal of the transistor T51 in the pull-down control circuit 450, the transistor T51 is turned on, and the clock signal LC1 is transmitted to the gate terminal of the transistor T53 through the transistor T51 to turn on the transistor T53, as such the clock signal LC1 is transmitted to the stabilization node P(n) through the transistor T53, thereby raising the potential of the stabilization node P(n) to turn on the transistors T32-T34 in the pull-down circuit 430, thereby performing the stabilization operation.

In some embodiments, by applying the potentials of nodes Q(n−2) and Q(n) to the gate terminals of the transistors T55 and T52, respectively, the transistors T55 or T52 are turned on, as such the potential of the system low voltage terminal VSSQ is transmitted to the gate terminal of the transistor T53 through the transistors T55 or T52, thereby turning off the transistor T53. In some embodiments, by applying the potentials of nodes Q(n−2) and Q(n) to the gate terminals of the transistors T56 and T54, respectively, the transistors T56 and T54 are turned on, as such the potential of the system low voltage terminal VSSQ is transmitted to the stabilization node P(n) through the transistors T56 and T54, thereby turning off the transistors T32-T34 in the pull-down circuit 430.

In some embodiments, when the potential of the stabilization node P(n) has an enabling level, the transistor T32 is turned on, as such the potential of the system low voltage terminal VSSQ is transmitted to the operation node Q(n) through the transistor T32, thereby turning off the transistor T21. At this time, the stage Gn outputs the voltage of the system low voltage terminal VSS as the scan signal SCa.

In some embodiments, the pull-down control circuit 460 changes the potential of the stabilization node K(n) according to the clock signal LC2, as such the pull-down circuit 440 operates according to the stabilization node K(n). In some embodiments, the transistors T61-T66 in the pull-down control circuit 460 are similar to the transistors T51-56 in the pull-down control circuit 450, and the transistors T42-T44 in the pull-down circuit 440 are similar to the transistors T32-T34 in the pull-down circuit 430, and the description is omitted here.

In some embodiments, by applying the control signals ST and S(n+6) to the transistors T45 and T41, respectively, the transistors T45 and T41 are turned on, as such the potential of the system voltage terminal VSSQ is transmitted to the operation node Q(n) through the transistors T45 or T41, thereby turning off the transistor T21.

As shown in FIG. 14, the stage GDn includes a pull-up control circuit 510, a pull-up circuit 520, pull-down control circuits 550 and 560, a pull-down circuit 530, and a pull-down circuit 540. Compared with the stage Gn in FIG. 13, the difference of the stage GDn is that the pull-up control circuit 510 is electrically isolated from a trace for transmitting the clock signal HC7 which is capable for an operation of the pull-up control circuit 510 and the system high voltage terminal VDD, and the pull-up circuit 520 is electrically isolated from a trace for transmitting the clock signal HC1 which is capable for an operation of the pull-up circuit 520, as such the pull-up control circuit 510 and the pull-up circuit 520 are inactive. In some embodiments, the first ends of the transistors T12 and T11 in the pull-up control circuit 510 and the transistor T21 in the pull-up circuit 520 are electrically floating. In other embodiments, the first ends of the transistors T12 and T11 in the pull-up control circuit 510 and the transistor T21 in the pull-up circuit 520 are configured to receive a preset voltage Vf. In further embodiments, the pull-down control circuits 550 and 560 and the pull-down circuits 530 and 540 of the stage GDn operate to output a stabilization signal Sr to the corresponding connection line Lb, but this is not limited to this case. The other detailed circuit connections of the stage GDn in FIG. 14 are similar to the detailed circuit connections of the stage GD in FIG. 13, and the description is omitted here.

Figure 15:
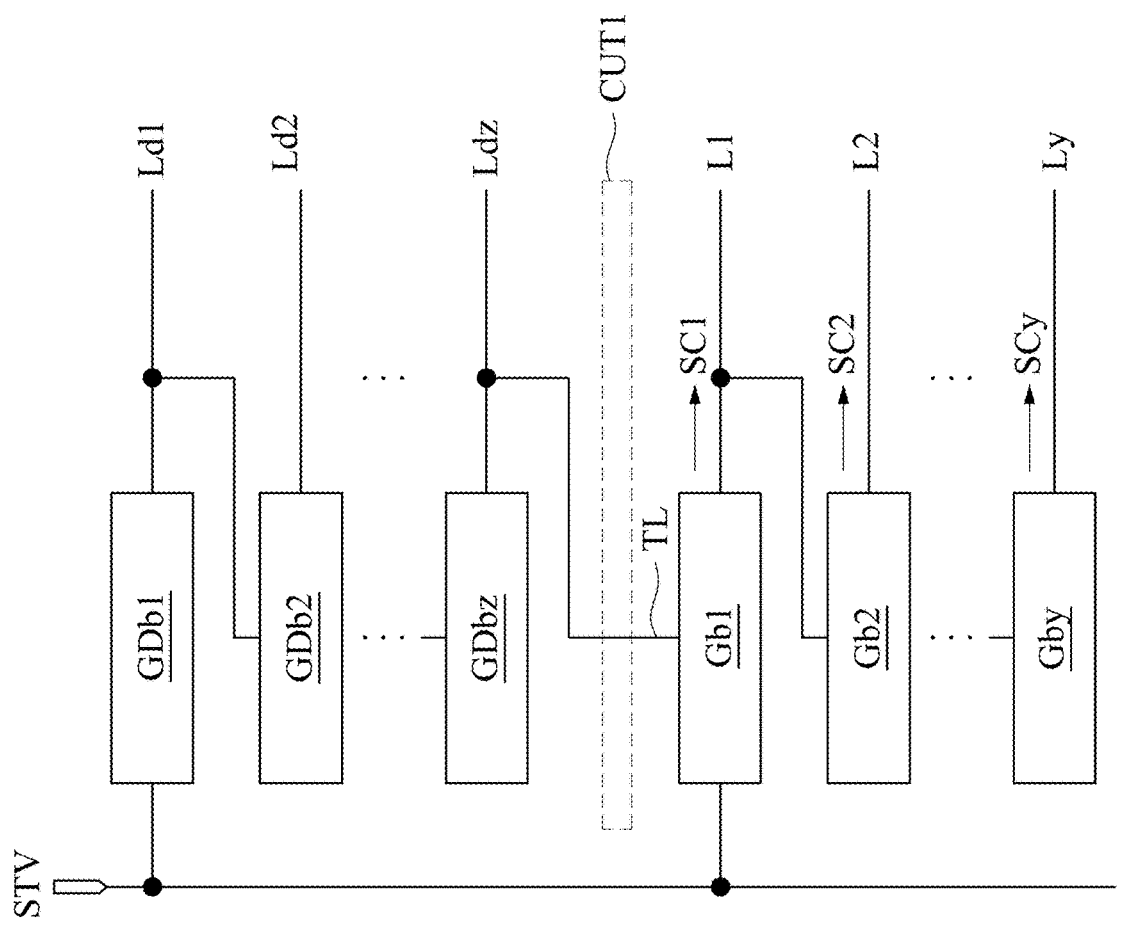
FIG. 15 is a schematic diagram of a stage according to some embodiments of the present disclosure.

Please refer to FIG. 15. FIG. 15 is a schematic diagram of the stages GDb1-GDbz and Gb1-Gby according to some embodiments of the present disclosure. In some embodiments, the stages GDb1-GDbz and Gb1-Gby of the scan driver DRb1 of the display device 200i in FIG. 11 are all implemented by the stage Gn in FIG. 13. In this case, the trace line TL between the stages GDb1-GDbz and the stages Gb1-Gby, which is capable to transmit the output of the stage GDbz, can be cut off along the cutting line CUT1 by laser cutting technology, as such the stages GDb1-GDbz are not connected in series to the stages Gb1-Gby. The start signal STV is provided to the stage Gb1, as such the stages Gb1-Gby respectively are the first stage to the last stage. In some embodiments, the stages Gb1-Gby output the scan signals SC1-SCy through the connection lines L1-Ly to the corresponding gate lines G1-Gy, respectively. It should be noted that there may be more trace lines (e.g., 7 lines) between the trace line TL between the stages GDb1-GDbz and the stages Gb1-Gby, which depends on the configuration of clock signals supplied to the stages. In this case, all the trace lines between the stages GDb1-GDbz and the stages Gb1-Gby can be cut off along the cutting line CUT1 by laser cutting technology. Therefore, it is not intended to limit the present disclosure.

Figure 16:
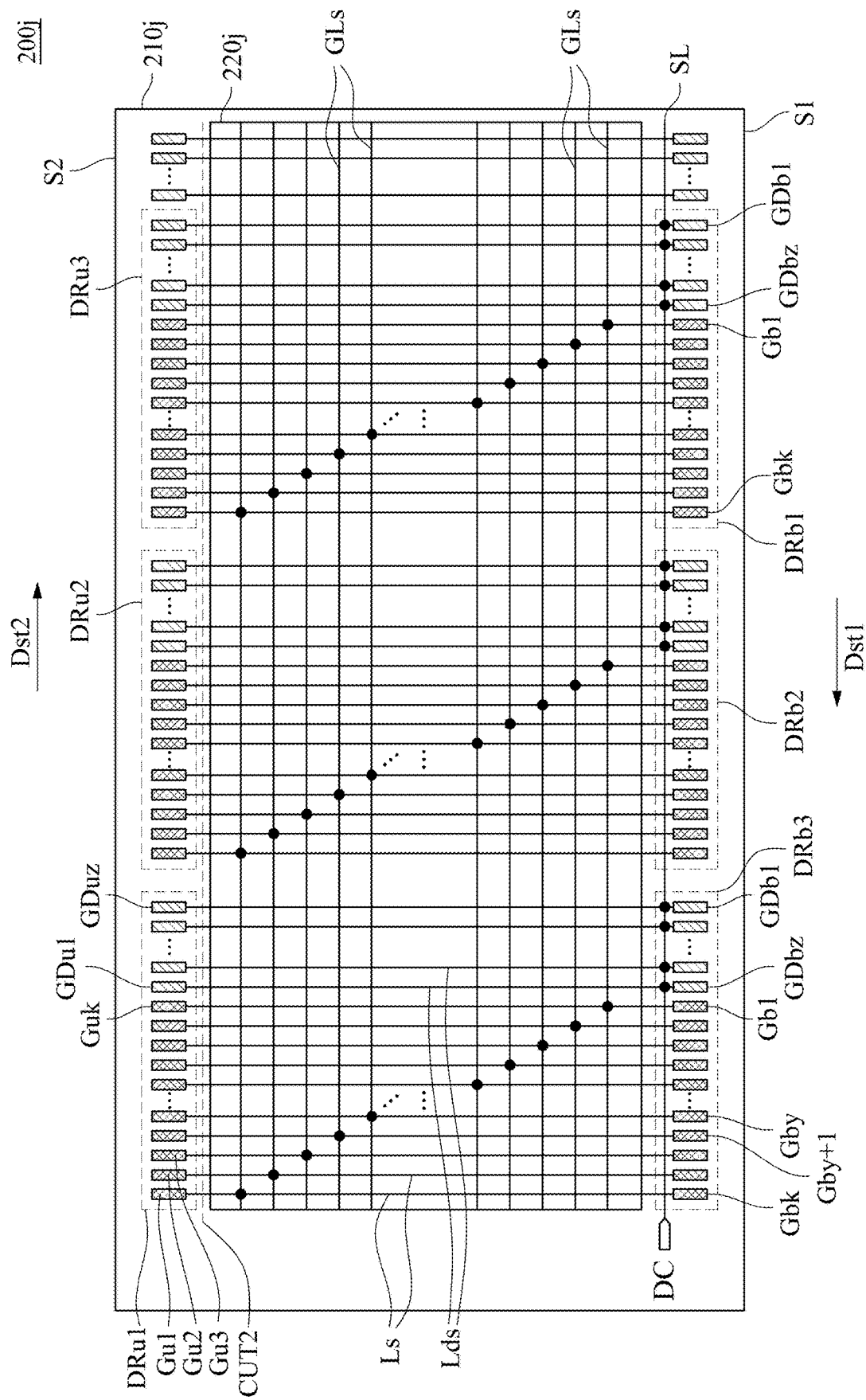
FIG. 16 is a schematic diagram of a display device according to some embodiments of the present disclosure.

Please refer to FIG. 16, which is a schematic diagram of the display device 200j according to some embodiments of the present disclosure. As shown in FIG. 16, the display device 200j includes a substrate 210j, a pixel array 220j, and scan drivers GDb1-GDb3 and GDu1-GDu3.

In some embodiments, the scan drivers GDb1-GDb3 are arranged on the first edge area of the substrate 210j, and the stages GDb1-GDbz (dummy stages) and the stages Gb1-Gbk (first stage to last stage) in each of the scan drivers GDb1-GDb3 are arranged in sequence along a direction the same as the signal transmission direction Dst1 on the first edge area of the substrate 210j. In some embodiments, the scan drivers GDu1-GDu3 are arranged on the second edge area of the substrate 210j, and the stages Gu1-Guk (first stage to last stage) and the stages GDu1-GDuz (dummy stages) in each of the scan drivers GDu1-GDu3 are sequentially arranged on the second edge area of the substrate 210j in the same direction as the signal transmission direction Dst2.

In some embodiments, the substrate 210j of the display device 200j is an uncut substrate. In some embodiments, the substrate 210j of the display device 200j corresponds to the substrate 110 in FIG. 2. In some embodiments, the arrangement of the components on the substrate 210j of the display device 200j is similar with or equal to the arrangement of the components on the substrate 110 in FIG. 2, and the description is omitted here.

In some embodiments, if the uncut substrate 210j is directly used in the display device 200j, there only need the scan driver disposed in one edge area to perform scanning, so the scan driver on the other edge area can be electrically isolated from the connection line Ls. For example, the output of the scan drivers DRu1-DRu3 on the second edge area of the substrate 210j can be cut off from the connection line Ls along the cutting line CUT2, and the scan drivers DRb1-DRb3 on the first edge area can be configured to scan the gate lines GLs. As another example, the output of the scan drivers DRb1-DRb3 on the first edge area of the substrate can be cut off from the connection line in the horizontal direction, and the scan drivers DRb1-DRb3 on the second edge area can be configured to scan the gate lines GLs.

In some embodiments, the output terminals of some of the stages GDb1-GDbz (dummy stages) can be electrically connected to the stabilization routing SL to stabilize the potential of the dummy connection lines Lds.

Figure 17:
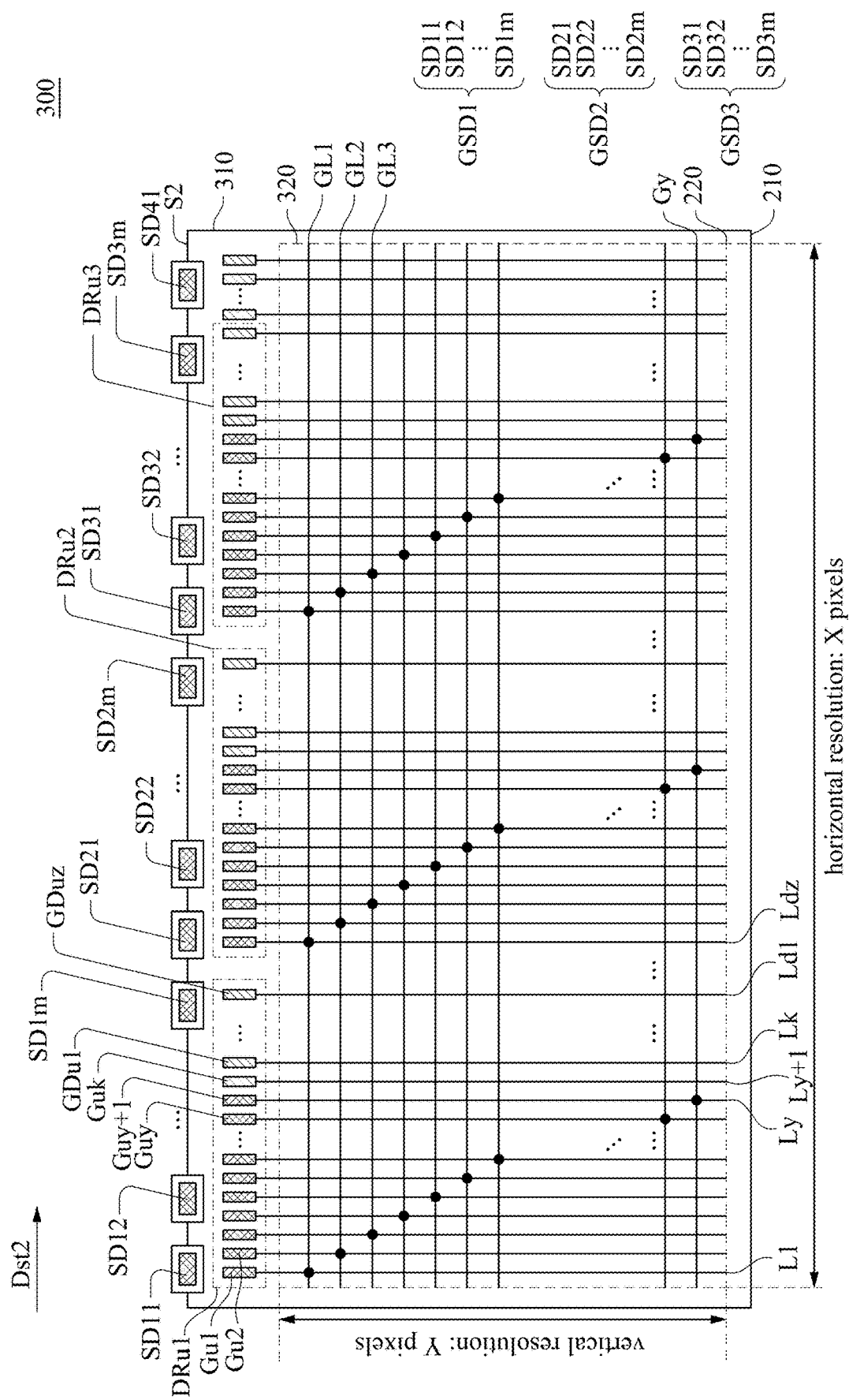
FIG. 17 is a schematic diagram of a display device according to some embodiments of the present disclosure.

Please refer to FIG. 17. FIG. 17 is a schematic diagram of a display device 300 according to some embodiments of the present disclosure. As shown in FIG. 17, the substrate 310 of the display device 300 is cut from the second edge area of the substrate 110 in FIG. 2. Therefore, the arrangement of the stages on each of the substrates 310a-310f in FIGS. 3 to 6 and FIGS. 9 to 10 is similar to the arrangement of the stages in the scan driver on the substrate 310 in FIG. 11.

As shown in FIG. 11, the display device 300 includes a substrate 310, scan drivers DRu1-DRu3, a pixel array 320, source driver groups GSD1-GSD3, and a source driver SD41. In some embodiments, the scan driver DRu1 includes stages Gu1-Guy, Guy+1-Guk, and GDu1-GDuz. In some embodiments, the stages GDu1-GDuz are dummy stages, and the stages Gu1-Guy are from the first stage to the last stage, where the stage Gu1 is the first stage, and the stage Guy is the last stage. In some embodiments, the stages Guy+1-Guk are dummy stages. In some embodiments, the stages Gu1-Guy (first stage to last stage) and the stages GDu1-GDuz (dummy stages) are sequentially arranged along the signal transmission direction Dst2 on the second edge area of the substrate 310.

In some embodiments, the pixel array 320 includes gate lines GL1-GLy and connection lines Ld1-Ldz, L1-Ly, and Ly+1-Lk. In some embodiments, the connection lines Ld1-Ldz are dummy connection lines, and the connection lines L1-Ly connect the stages Gb1-Gby to the corresponding gate lines GL1-GLy. In some embodiments, the connection lines L1-Ly sequentially connect the gate lines GL1-GLy to the stages Gu1-Guy based on the distance of the gate lines GL1-GLy from the scan driver DRu1 from near to far. In other embodiments, the connection lines L1-Ly connect the gate lines GL1-GLy to the stages Gu1-Guy in a partially staggered manner based on the distance of the gate lines GL1-GLy from the scan driver DRu1 from near to far, thus it is not intended to limit the present disclosure.

In some embodiments, the source driver group GSD1 is configured to correspondingly connect to the wiring in the component layout region of the scan driver DRu1. In some embodiments, the source driver group GSD1 includes m source drivers SD11-SD1m. In some embodiments, to ensure that the fan-out routing of the m source drivers SD11-SD1m can correspondingly connect to the wiring in the component layout region of the scan driver DRu1, the total number of stages GDu1-GDuz and Gu1-Guk in the scan driver DRb1 is a multiple of "m". In other words, "m" is a factor of the total number of stages GDu1-GDuz and Gu1-Guk in the scan driver DRu1.

In some embodiments, each of the source drivers SD11-SD1m interleaves q stages (e.g., 304 stages) between the lines connected to each source driver, and each of the source drivers SD11-SD1m is configured to drive p pixel channels (e.g., 320 pixel channels or 960 sub-pixel channels).

In some embodiments, the display device 300 includes source driver groups GSD1-GSD3 and a source driver SD41. Each of the source driver groups GSD1-GSD3 includes 5 source drivers, and each of the aforementioned source drivers is configured to drive 320 pixel channels. In other words, the horizontal resolution of the display device 300 is 5120 pixels. In other embodiments, the horizontal resolution of the display device 300 may vary depending on the size of the substrate 310 and the number of source drivers configured accordingly, and it is not intended to limit the present disclosure.

Figure 19:
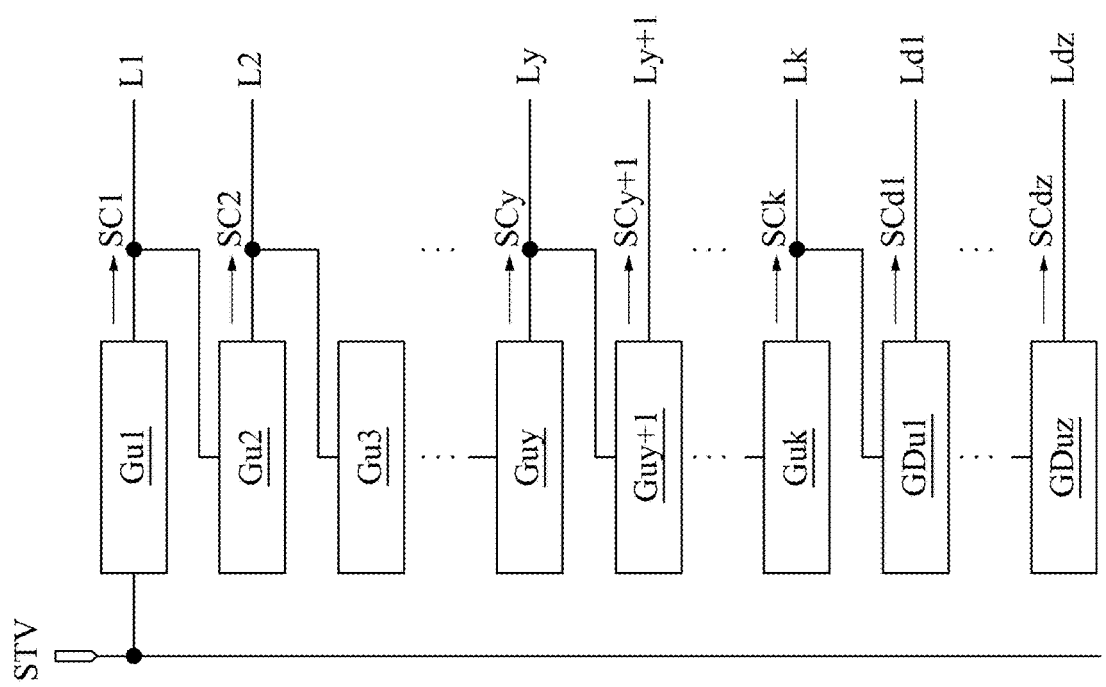
FIG. 19 is a schematic diagram of a display cycle of a display device according to some embodiments of the present disclosure.
Figure 18:
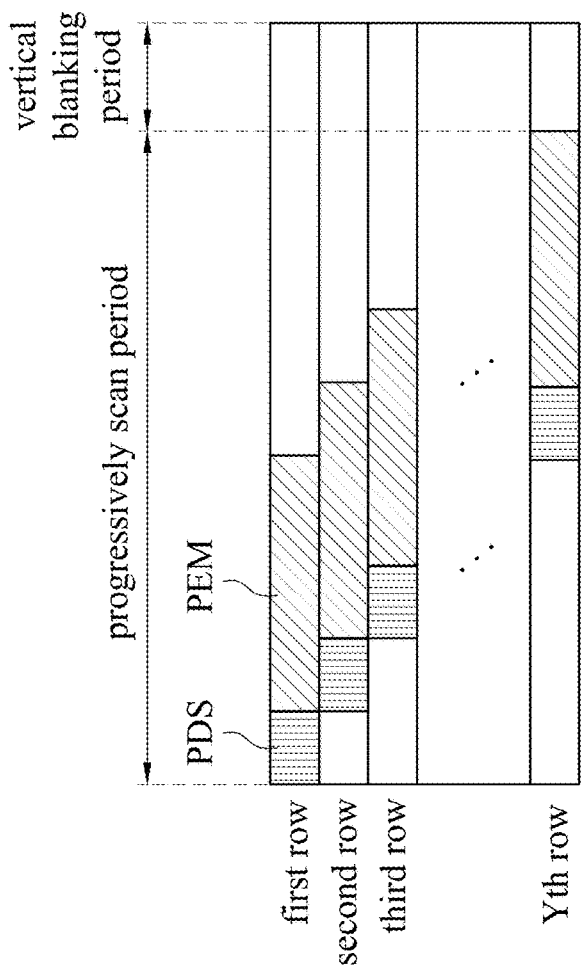
FIG. 18 is a schematic diagram of a stage according to some embodiments of the present disclosure.

Please refer to FIG. 18 and FIG. 19. FIG. 18 is a schematic diagram of the stages Gu1-Guk and GD1-GDuz according to some embodiments of the present disclosure. FIG. 19 is a schematic diagram of the display cycle of the display device 300 according to some embodiments of the present disclosure.

In some embodiments, each of the stages Gu1-Guy, Guy+1-Guk, and GDu1-GDuz included in the scan driver DRu1 in FIG. 17 can be implemented by the stage Gn in FIG. 13. That is, the stages Gu1-Guy (first stage to last stage) will output scan signals SC1-SCk, and the stages Guy+1-Guk and GDu1-GDuz (dummy stages) will output scan signals SCy+1-SCk and SCd1-SCdz. In such a case, the scan signals SCy+1-SCk and SCd1-SCdz generated by the stages Guy+1-Guk and GDu1-GDuz (dummy stages) can be set to the enable voltage in the vertical blanking period of the display device 300, as such the dummy stages of the second scan driver are enabled during the vertical blanking period, so as to not display visible data in the vertical blanking period. In some embodiments, a display cycle of the display device 300 includes a progressively scan period and a vertical blanking period. In some embodiments, the stages Gu1-Guy (first stage to last stage) scan the gate lines G1-Gy during the progressively scan period. In some embodiments, the time length of the vertical blanking period is longer than the product of the total number of stages GDu1-GDuz (dummy stages) and one horizontal scan period. In other embodiments, the time length of the vertical blanking period is longer than the product of the total number of stages Guy+1-Guk and GDu1-GDuz (dummy stages) and one horizontal scan period. In some embodiments, the scan signals SC1-SCk output by the stages Gu1-Guy have an enable level during the scan period PDS of the corresponding pixel rows, thereby scanning the pixel array 320. In some embodiments, each pixel row of the display device 300 emits light progressively during the emission period EM. In other embodiments, each pixel row of the display device 300 emits light simultaneously, but this is not intended to limit the present disclosure.

In other embodiments, each of the stages Gu1-Guy, Guy+1-Guk, and GDu1-GDuz in the scan driver DRu1 in FIG. 17 can be implemented by the stage Gn in FIG. 13. Before entering the activation period of the stages Guy+1-Guk and GDu1-GDuz (dummy stages), the potential of each clock signal (e.g., clock signals HC1 and HC7) can be changed to the disable level (e.g., low logic level) to prevent the stages Guy+1-Guk and GDu1-GDuz (dummy stages) from operating.

In further embodiments, each of the stages Gu1-Guy (first stage to last stage) in the scan driver DRu1 in FIG. 17 can be implemented by the stage Gn in FIG. 13, and the stages Guy+1-Guk and GDu1-GDuz (dummy stages) in the scan driver DRu1 in FIG. 17 can be implemented by the stage GDn in FIG. 14, as such the dummy stages are inactive.

In summary, the display devices 100, 200i, 200j, and 300 provided by the present disclosure can meet the exposure and docking requirements between the source drivers and the stages on the array, and have the effect of a narrow bezel. Furthermore, the substrate 110 can provide various sizes of cuts, thereby reducing manufacturing costs and increasing product adaptability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
a substrate;
a pixel array, formed on the substrate, comprising:
  a plurality of gate lines, extending along a first direction; and
  a plurality of connection lines, extending along a second direction different from the first direction;
a first scan driver, formed on the substrate, the first scan driver comprising a first stage to a last stage and a plurality of dummy stages, wherein the first stage to the last stage of the first scan driver are respectively connected through the connection lines to the gate lines,
and wherein the dummy stages and the first stage to the last stage of the first scan driver are arranged in sequence along a direction the same as a first signal transmission direction on the substrate, and the first signal transmission direction is parallel to the first direction; and
a second scan driver, wherein the second scan driver and the first scan driver are formed along the second direction, and the pixel array is located between the first scan driver and the second scan driver, the second scan driver comprising a first stage to a last stage and a plurality of dummy stages, wherein the first stage to the last stage of the second scan driver respectively correspond to the gate lines, wherein the first stage to the last stage and the dummy stages of the second scan driver are sequentially arranged on the substrate in a direction the same as a second signal transmission direction, and wherein the second signal transmission direction is opposite to the first signal transmission direction, and the second signal transmission direction is parallel to the first direction.

2. The display device of claim 1, wherein the dummy stages of the first scan driver are not connected in series to the first stage to the last stage of the first scan driver.

3. The display device of claim 1, wherein each of the dummy stages of the first scan driver comprises:
a pull-up control circuit, the pull-up control circuit being electrically isolated from a trace for transmitting a first clock signal which is capable for an operation of the pull-up control circuit, as such the pull-up control circuit is inactive; and
a pull-up circuit, the pull-up circuit being electrically isolated from a trace for transmitting a second clock signal which is capable for an operation of the pull-up circuit, and a control terminal of the pull-up circuit being electrically coupled to the pull-up control circuit, as such the pull-up circuit is inactive.

4. The display device of claim 1, wherein the connection lines connect the gate lines to the first stage to the last stage of the first scan driver in sequence based on a distance from the gate lines to the first scan driver from near to far.

5. The display device of claim 1, further comprising:
a first source driver group, comprising a plurality of first source drivers, wherein the first source drivers are fan-out connected to a first component layout region where the first scan driver disposed therein, and wherein the number of the first source drivers is a factor of a total number of the first stage to the last stage and the dummy stages of the first scan driver.

6. The display device of claim 1, wherein the first stage to the last stage of the second scan driver are electrically isolated from the gate lines via a cutting line.

7. The display device of claim 1, wherein the first stage to the last stage of the second scan driver are respectively electrically connected to the gate lines, wherein a display cycle of the display device comprises a progressively scan period and a vertical blanking period, wherein the first stage to the last stage of the second scan driver scan the gate lines during the progressively scan period, wherein the dummy stages of the second scan driver are enabled during the vertical blanking period, and wherein a time length of the vertical blanking period is greater than a product of a horizontal scan period and the number of the dummy stages.

8. The display device of claim 1, wherein before entering an activation period of the dummy stages of the second scan driver, potential of each clock signal can be changed to a disable level, as such the dummy stages are inactive.

9. The display device of claim 1, further comprising:
a plurality of dummy connection lines respectively corresponding to the dummy stages, wherein the dummy connection lines are configured to receive a direct current signal.

10. The display device of claim 1, wherein the first signal transmission direction is a direction that a start pulse provided as a shift data being transmitted from the first stage to the last stage of the first scan driver.

11. A display device, comprising:
a substrate;
a pixel array, formed on the substrate, comprising:
a plurality of gate lines, extending along a first direction; and
a plurality of connection lines, extending along a second direction different from the first direction;
a first scan driver, formed on the substrate, the first scan driver comprising a first stage to a last stage and a plurality of dummy stages, wherein the first stage to the last stage of the first scan driver are respectively connected through the connection lines to the gate lines,
and wherein the dummy stages of the first scan driver are closer to the first stage of the first scan driver than the last stage of the first scan driver, and the dummy stages and the first stage to the last stage of the first scan driver are arranged in parallel with the first direction; and
a second scan driver, formed on the substrate, comprising a first stage to a last stage and a plurality of dummy stages, and wherein the dummy stages of the second scan driver are closer to the last stage of the second scan driver than the first stage of the second scan driver, and the first stage to the last stage and the dummy stages of the second scan driver are arranged in parallel with the first direction,
wherein the second scan driver and the first scan driver are formed along the second direction, and the pixel array is located between the first scan driver and the second scan driver.

12. The display device of claim 11, wherein the pixel array further comprises plurality of dummy connection lines, and wherein the dummy connection lines connect the dummy stages of the first scan driver to the dummy stages of the second scan driver.

13. The display device of claim 11, wherein the first scan driver formed on an edge area of the substrate, wherein the display device further comprising:
a plurality of source drivers, configured to disposed in the edge area of the substrate.

14. The display device of claim 13, wherein the number of the source drivers is a factor of a total number of the first stage to the last stage and the dummy stages of the first scan driver.

15. The display device of claim 11, wherein a total number of the dummy stages and the first stage to the last stage of the first scan driver is the same as a total number of the dummy stages and the first stage to the last stage of the second scan driver.

16. A display device, comprising:
a substrate;
a pixel array, formed on the substrate, comprising:
a plurality of gate lines, extending along a first direction; and
a plurality of connection lines, extending along a second direction different from the first direction; and
a scan driver, formed on the substrate, the scan driver comprising a first stage to a last stage and a plurality of dummy stages, wherein the first stage to the last stage of the scan driver are respectively connected through the connection lines to the gate lines, and wherein the dummy stages of the scan driver are closer to the last stage of the scan driver than the first stage of the scan driver, wherein a display cycle of the display device comprises a progressively scan period and a vertical blanking period, wherein the first stage to the last stage of the scan driver scan the gate lines during the progressively scan period, wherein the dummy stages of the scan driver are enabled during the vertical blanking period, and wherein a time length of the vertical blanking period is greater than a product of a horizontal scan period and the number of the dummy stages.

* * * * *